March 25, 1930. A. M. BAIRD 1,751,970
PRESSURE REGULATOR FOR AIR SERVICE APPARATUS
Filed Nov. 21, 1927

INVENTOR.
Archie M. Baird
BY Roy E. Hamilton
ATTORNEY.

Patented Mar. 25, 1930

1,751,970

UNITED STATES PATENT OFFICE

ARCHIE M. BAIRD, OF TOPEKA, KANSAS

PRESSURE REGULATOR FOR AIR-SERVICE APPARATUS

Application filed November 21, 1927. Serial No. 234,864.

This invention relates generally to pressure regulators for air service apparatus for the power inflation of pneumatic tires and the like, ordinarily accomplished from a power supply of air, as for instance an air compressor, thru a flexible hose having a service chuck at its free end, provided with a valve therein which opens when the chuck is pressed on to the exposed end of the tire valve stem.

The main object of this invention is to provide a pressure regulator for air service apparatus, by means of which fluid of a lower pressure may be delivered to a pneumatic tire tube, or the like, from a pipe or reservoir in which a higher fluid pressure is exerted, by regulating the inflow of pressure fluid in a container interposed in the fluid line from the high pressure reservoir to the tube to be inflated, and also by maintaining a predetermined fluid pressure in said container by relieving any excess pressure in the same due to varying conditions in the supply to and exhaust from the same.

Another object of this invention is the contemplation of a pressure regulating device which will deflate an overinflated tire tube to any desired predetermined pressure.

A further object is the provision of a simple, inexpensive device which will be continuously and uniformly effective and efficient, and will be accurate for inflating and deflating pneumatic tires to a predetermined pressure.

A still further object is the provision of a device as described, which is portable and is provided with a plurality of service hose and which also has a protected visible pressure gauge.

Minor objects will appear during the course of the detailed specification referring to the drawings, in which Figure 1, is a front elevation of a pressure regulating device embodying this invention.

Figures 1, 2:
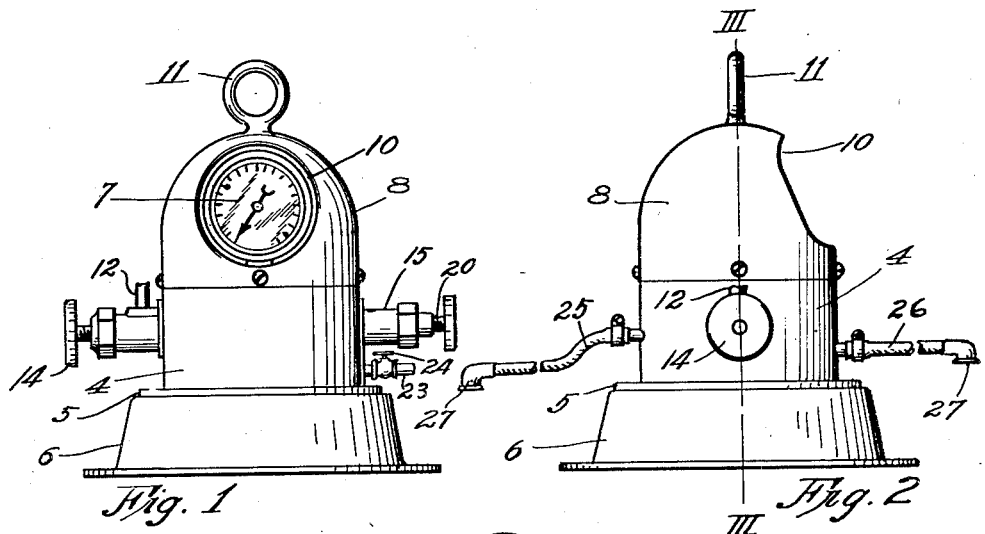
Fig. 2, is a side elevation of the same.
Figure 3:
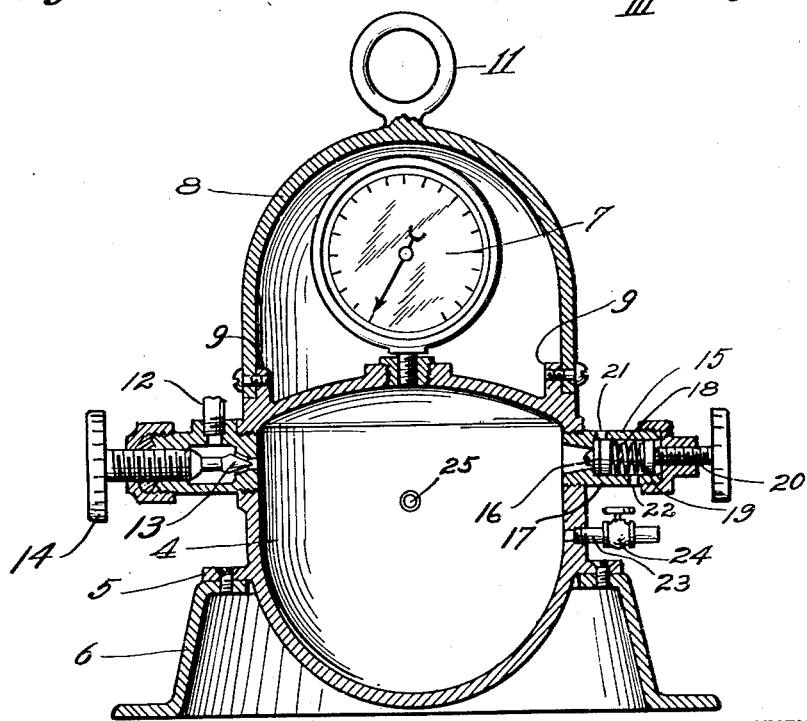
Fig. 3, is an enlarged vertical section taken on line III—III of Fig. 2.

Similar reference characters refer to like parts throughout the several views, and the numeral 4 designates an air chamber of such construction that it will withstand a high fluid pressure without fracture. A suitable flange 5 integral with air chamber 4 is provided with screws by means of which the base member 6 is securely attached thereto. Positioned above the air chamber 4 and carried thereby is a pressure gauge 7 which communicates with said air chamber, and registers the pressure of the air in said chamber. A housing 8 which is securely attached to the lugs 9 integral with the air chamber 4 by means of screws serves to protect pressure gauge 7. An opening 10 in the front of housing 8 permits the operator to read the pressure gauge. A suitable finger hold 11 is provided at the top of the housing 8 by means of which the device may be moved from one place to another to suit the convenience of the operator. A fluid pressure line 12, communicating with any fluid pressure source, such as an air compressor or pressure tank, is preferably made of flexible material in order to permit the positioning of the device in various places, also communicates with the air chamber 4.

A needle valve 13 is positioned between the supply line 12 and the air chamber 4 to regulate the flow of fluid pressure from said air line to said chamber. Needle valve 13 has a graduated head 14, by means of which the same is adjusted and which indicates to the operator the position of said valve relative to its seat.

The air chamber 4 is provided with an adjustable relief valve 15, having a valve member 16 slidably mounted in a housing 17. A tension spring 18 mounted in housing 17 and interposed between valve member 16 and an adjusting block 19 is tensioned to any desired degree by means of the adjusting screw 20 which has a graduated head to indicate the pressure at which the relief valve will operate. An opening 21 is provided in the housing 17, adjacent the valve member 16, to permit the release of pressure fluid to the atmosphere when the valve member is moved outwardly by the action of the fluid pressure. Another opening 22 in the housing 17 is outside the valve member and permits the release of any air that might leak past said valve, thus maintaining an atmospheric pressure on the outside of the valve. A pipe 23 communicating with the chamber 4, and having a pet cock 24 may be used as an auxiliary fluid release, and may also be utilized in draining any condensate from the chamber 4.

For the delivery of compressed air from the chamber 4 to the pneumatic tire to be inflated, flexible tubes 25 and 26 communicate with said chamber, and are each provided at their free end with service chucks 27 having a valve therein which opens when the chuck is pressed on to the exposed end of the valve stem. This type of chuck is old, and is not here shown in detail. While I have shown but two service hose, with the construction of an apparatus of this character, it is apparent that any desired number of hose may be used.

*Operation*

When it is desired to inflate a pneumatic tire tube to any desired pressure, say 30-pounds, and the fluid pressure in the reserve tank or line from which the pressure fluid is to be obtained is of a higher pressure, such as 100-pounds, the needle valve 13 is opened sufficiently to allow a sufficient amount of pressure fluid at 100-pounds pressure to flow into the air chamber 4, to provide pressure fluid at 30-pounds pressure in said air chamber, while air is being delivered thru tube 23 into the tire tube. If the valve in the service chuck is closed so that no air can pass thru the tube 23, it is apparent that with the needle valve opened as stated, the pressure would build up in the air chamber 4. Also, should the needle valve 13 be opened too far, so that the tube 23 when the valve in the chuck was opened could not take care of the incoming air at the 30-pounds pressure, the pressure in chamber 4 would increase. To provide for these contingencies, and also to insure a constant predetermined pressure in the air chamber 4, the relief valve 15 is so adjusted that when the pressure in the air chamber exceeds the predetermined pressure which in this case is 30 pounds, then the valve 16 will be moved outwardly, due to the excess air pressure against the action of the tension spring 18, thus permitting the flow of the excess pressure fluid thru the opening 21 to the atmosphere. Should it be desired to use more than one of the service tubes at the same time, it is necessary to increase the inflow of pressure fluid into the air chamber 4 by properly adjusting the needle valve 13, in order to maintain the predetermined pressure in the air chamber.

By properly adjusting the valves, tire tubes may be inflated to any desired degree of pressure such as the very low pressure commonly used in the balloon tire to a pressure equal to that of the pressure in the supply line.

The operation of deflating an overinflated tube may be effected as follows: Should the tire be inflated to 50-pounds pressure, and it is desired to reduce that pressure to 30-pounds, the device as set to inflate a deflated tire tube as explained above will deflate said tire tube to a 30-pound pressure by simply attaching the service chuck to the exposed end of the tube stem and permitting the excess pressure fluid to pass thru said tube into air chamber 4, and thence thru the relief valve to opening 21 to the atmosphere. As soon as the 30-pound pressure has been reached, relief valve 15 will close and no more pressure fluid will pass from the tire tube.

I do not limit this invention to the structure shown and described, as many modifications may be made within the scope of the appended claims without departing from the spirit thereof.

What is claimed as new and desired to be secured by Letters Patent is:

1. A device of the character described comprising an air container of relatively large volume having substantially vertical and horizontal dimensions and having an air inlet and a plurality of air service lines extending therefrom, a service chuck at the free end of each of said service lines to normally close the same, an adjustable needle valve between said inlet and container, a pressure gauge on said container to indicate the pressure therein, a housing for said pressure gauge, a relief valve to maintain a predetermined pressure in said container, and an auxiliary valve controlled outlet to said air container.

2. A combined inflating valve and gauge, comprising an air reservoir of relatively large volume and having an air inlet and an air outlet, an adjustable valve to regulate the air flow from said inlet to said reservoir, a flexible tube connected with said outlet and having a service valve at its free end adapted to normally close said tube to maintain a pressure in said reservoir and to be quickly connected with tire tubes for inflation or deflation thereof, a base secured to said reservoir and extending therebelow to support it in a predetermined upright position, a removable housing positioned on top of said reservoir and extending therebelow and having an opening therein, a pressure gauge mounted on said container, and within said housing to indicate the pressure in said container, and an adjustable pressure release valve communicating with said air chamber.

3. A pressure regulator for air service apparatus comprising an air reservoir of relative large volume and of large horizontal cross sectional area, a valve controlled inlet to said reservoir communicating with a supply of pressure fluid, a series of flexible tubes communicating with said reservoir through the side walls thereof, each of said tubes having a service valve at its free end adapted to normally close said tubes to maintain a pressure in said reservoir and to be quickly attached to a tire tube for inflating or deflating the same, and an adjustable relief valve regulated to release pressure in said reservoir when a predetermined pressure is obtained therein.

4. A pressure regulator for air service apparatus comprising an air reservoir of relative large volume and of large horizontal cross sectional area, a valve controlled inlet to said reservoir communicating with a supply of pressure fluid, a series of flexible tubes communicating with said reservoir through the side walls thereof, each of said tubes having a service valve at its free end adapted to normally close said tubes to maintain a pressure in said reservoir and to be quickly attached to a tire tube for inflating or deflating the same, an adjustable relief valve regulated to release pressure in said reservoir when a predetermined pressure is obtained therein and a base secured to said reservoir and extending therebelow to support said apparatus in an upright position.

In testimony whereof, I hereunto affix my signature.

ARCHIE M. BAIRD.